A. KINGSBURY.
BEARING.
APPLICATION FILED JAN. 15, 1918.

1,412,353.

Patented Apr. 11, 1922.

INVENTOR
Albert Kingsbury
BY
Marshall & Dearborn
ATTORNEYS

UNITED STATES PATENT OFFICE.

ALBERT KINGSBURY, OF PITTSBURGH, PENNSYLVANIA.

BEARING.

1,412,353.  Specification of Letters Patent.  Patented Apr. 11, 1922.

Application filed January 15, 1918. Serial No. 211,905.

*To all whom it may concern:*

Be it known that I, ALBERT KINGSBURY, a citizen of the United States of America, and a resident of Pittsburgh, county of Allegheny, and State of Pennsylvania, have invented certain new and useful Improvements in Bearings, of which the following is a specification, reference being had to the accompanying drawings, forming a part thereof.

My invention relates to bearings, and has special reference to thrust bearings and combined guide and thrust bearings which are particularly adapted for use with marine propeller shafts or other substantially horizontal shafts.

One object of my invention is to provide a particularly simple thrust bearing for horizontal or inclined shafts that is constructed and arranged to avoid leakage of the oil around the shaft while insuring adequate and automatic lubrication of the bearing surfaces.

Another object of my invention is to provide a thrust bearing so constructed and arranged that the bearing members are readily accessible for adjustment, inspection, removal and replacement.

Another object of my invention is to provide a single shoe thrust bearing having an improved shoe structure and means for supporting the same.

In order that my invention may be thoroughly understood I will now proceed to describe the same in the following specification by reference in one embodiment thereof, and will then point out the novel features thereof in appended claims. The invention, however, is capable of receiving a variety of mechanical expressions, only one of which is shown on the accompanying drawings, and it is to be expressly understood that the drawings are for purposes of illustration only and are not to be construed as a definition of the limits of the invention, reference being had to the appended claims for that purpose.

Referring to the drawings.

Figure 1:
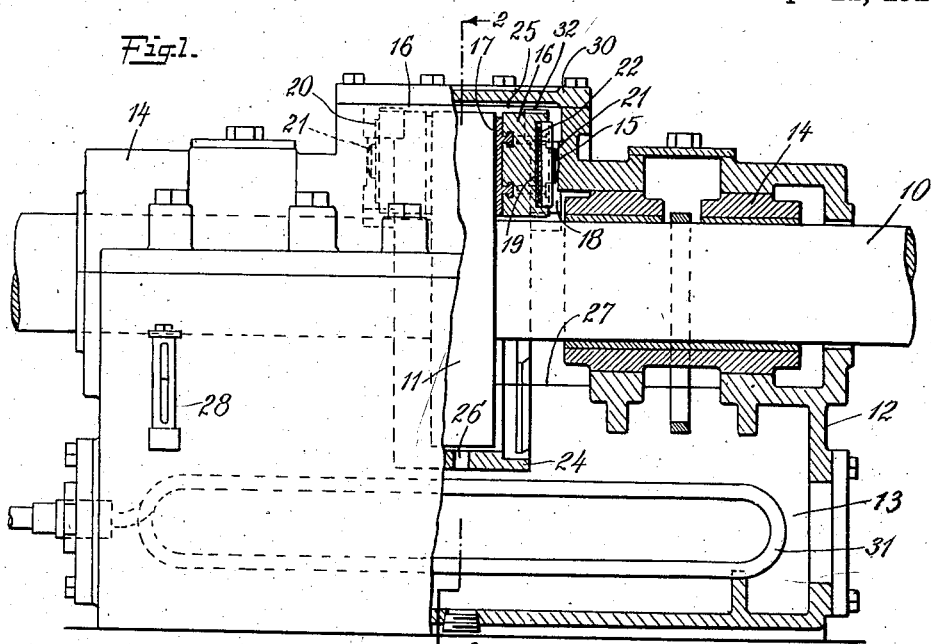
Figure 1 is a longitudinal elevation partially in section of a bearing arranged and constructed in accordance with my invention and constituting an embodiment thereof.
Figure 3:
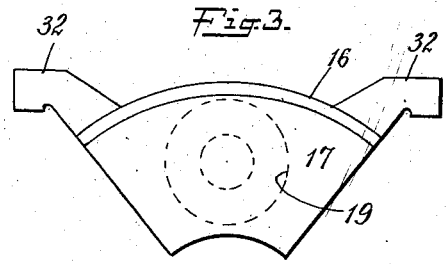
Figures 3 and 4 are detail views of one of the thrust shoes.
Figure 4:
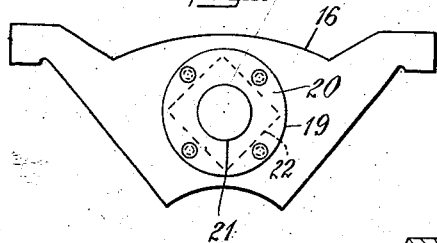

In the drawings: 10 designates a substantially horizontal shaft having a thrust collar 11, and 12 designates a bearing housing having an oil well 13 formed in the base and a pair of guide bearings 14 at the respective sides of the thrust collar 11.

In the form shown, the thrust collar 11 extends between thrust surfaces 15 at the top of the housing and a pair of thrust bearing shoes or ring sectors 16 are tiltably mounted on the thrust surfaces 15 and provided with bearing surfaces 17 which cooperate with the thrust bearing surfaces of the collar 11.

The thrust bearing shoes 16 are positioned on opposite sides of the thrust collar, their points of engagement with the thrust surface 15 being preferably in axial alignment. They are held against rotation about the center of the shaft as an axis in any suitable way, as by means of projections 18 on the housing, between which they fit loosely.

In the form illustrated, each shoe has a recess 19 formed in its back, into which a preferably hardened block 20 is set. The block has a spherically curved projection 21 which forms a ball pivot for the shoe and engages the thrust surface 15 of the housing. The block 20 is shown as bolted to the body of the shoe and the bearing surface of the shoe may be conveniently adjusted relatively to the ball pivot by introducing shims 22 in the recess 19 under the block.

Figure 2:
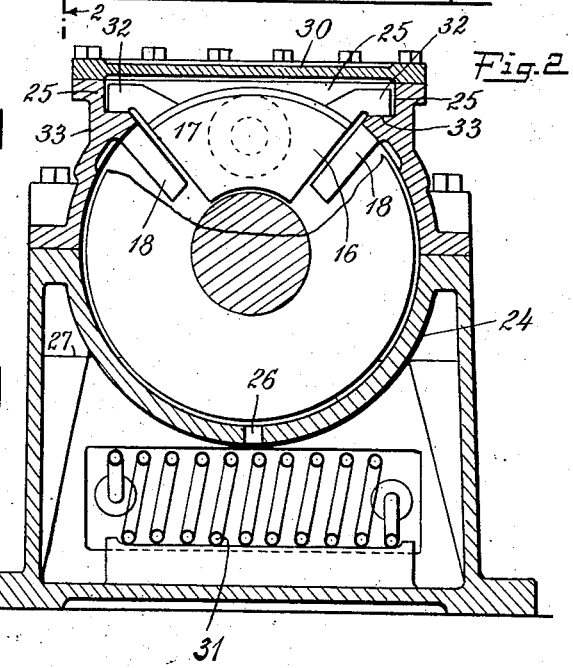
Figure 2 is a transverse section taken on the line 2—2 of Figure 1.

The housing is shown as provided with a short sleeve or annulus 24 into which the thrust collar 11 fits loosely, the arrangement being such that there is only a narrow annular oil space between the collar and the sleeve except that at any suitable place above the level of the oil in the well and shown as at the top of the housing the sleeve is cut away and the housing enlarged to form a pocket 25 as clearly shown in Figure 2.

The bearing shoes are mounted in any suitable way in or adjacent to said pocket so as to be readily accessible for inspection, removal and replacement through said pocket. In the structure illustrated each shoe is supported by a pair of outwardly projecting lugs 32 which extend into the sides of the pocket 25 and rest on ledges 33 of the housing.

The sleeve 24 preferably has an opening 26 at the bottom below the oil level 27 in the reservoir 13. The oil level may be indicated by a gage such as 28 and is preferably maintained sufficiently below the bottom of the shaft so that there is no danger of its leaking out around the shaft at the ends of the housing.

The housing is also preferably divided, for example along a substantially central horizontal plane, so that the upper part may be lifted off if desired.

In the form shown, the pocket 25 is closed by a removable cover plate 30, the arrangement being such that said cover plate coacts with the lugs 32 on the shoes to retain the latter in position, but when the cover plate is off the bearing shoes 16 may be readily lifted out for inspection and repair.

I prefer to provide a cooling coil 31 in the bottom of the housing where it is immersed in and serves to prevent substantial heating of the oil when water or other cooling fluid is circulated through it.

In operation, the thrust collar 11 dips into the oil in the well 13, picking up and carrying the oil on its faces as the collar rotates. While centrifugal force tends to throw this oil toward the periphery of the collar, gravity overcomes this tendency to a greater or less extent in that portion of the collar that is uppermost, whereby the bearing faces of the collar are at all times sufficiently supplied with oil when coacting with the bearing shoes 16. The oil therefore becomes automatically wedged under the bearing shoes 16, the pivotal mounting of the shoes permitting the same to tilt both radially and circumferentially in accordance with the principle disclosed in my prior patents. The cover 30 which closes at the top the notches into which the shoe projections or lugs 32 extend cooperates with said lugs in holding the shoes in position but does not interfere with the proper tilting of the shoes. On the other hand, said cover may be readily removed without dismantling any of the parts of the bearing structure, and said shoes may then be easily inspected, adjusted, removed or replaced through the opening thus provided in the housing wall.

As there are only a pair of bearing shoes, one for each direction of thrust, said shoes readily adjust themselves to the bearing surfaces of the thrust collar even if the shaft is not in perfect alignment or the thrust surfaces of the collar become more or less irregular or distorted for any cause, such as the heating of the collar in operation.

Furthermore, since there is only a single shoe cooperating with each thrust face of the collar 11, the bearing is completely self-oiling, oil being always carried directly to the shoe for either direction of shaft rotation, by the thrust surface with which it cooperates. In other words, there are no other bearing members cooperating with the same surface in such a way as to scrape off the oil in advance.

Moreover, there is a marked advantage in placing the bearing shoe above instead of below the shaft because, with the latter arrangement, the centrifugal action of the rotatable thrust surface tends to throw the oil radially outward and remove the oil from the inner portion of the bearing surface which coacts with the corresponding portion of the shoe. When the shoe is above the shaft however, the action of gravity causes the oil to run radially inward down the edges of the relatively stationary shoe and in this way the oil is well distributed. On the other hand, if the shoe is placed below the shaft—and even if it is immersed in oil—gravity and centrifugal force both act in such manner as to carry the oil away from that part of the shoe which is close to the shaft.

On the other hand, the location of the shoe or shoes above the shaft greatly facilitates inspection, adjustment, and repair of the parts. The single shoe thrust arrangement may of course be employed independently of a guide bearing if desired, and the complete bearing may comprise only a single shoe where the thrust is always in one direction.

It will therefore be perceived that I have provided a thrust bearing for substantially horizontal, which term is to be construed as including inclined, shafts whereby the level of the oil in the well may be kept sufficiently below the level of the shaft to insure against leakage when the bearing is in operation while, at the same time, the bearing shoe or shoes may be positioned closely to the shaft and the moment of the thrust pressure about the axis of the shaft kept at a minimum. Moreover, no equalizing members are necessary for this bearing, the bearing members are readily accessible for inspection and repair without removing the shaft or even dismantling the bearing housing, and the bearing members are self-oiling and self-aligning.

A structure, of a preferred form and construction, has been illustrated and described for the purpose of showing a way in which this invention may be used, but the invention is not to be restricted to the form shown, as the same is capable of receiving a variety of mechanical expressions, some of which will readily suggest themselves to those skilled in the art, while certain features are capable of use without other features thereof. Reference is therefore to be had to the appended claims for a definition of the limits of the invention.

What I claim is:

1. A thrust bearing comprising an oil container, a rotatable member having a thrust surface extending into the container and dipping into the oil therein, and a single bearing shoe cooperating with the thrust surface above the oil level and lubricated by oil carried thereto on said rotatable member.

2. A thrust bearing comprising an oil container, a rotatable member having a thrust surface extending into the container and dipping into the oil therein, and a single bearing shoe tiltably mounted above the oil level and cooperating with the thrust surface.

3. A thrust bearing comprising an oil container, a substantially horizontal shaft having a thrust collar arranged to dip into the oil in said container, and a single tiltably-mounted bearing shoe cooperating with the thrust collar above the level of the oil and lubricated by oil carried thereto on said thrust collar.

4. A thrust bearing comprising a housing formed to provide an oil reservoir, a substantially horizontal shaft, a thrust collar thereon having a radial thrust surface dipping into the oil in the reservoir, and a single bearing shoe having radial edges inclined downwardly toward the center of the shaft and cooperating with the thrust surface of the collar above the level of the oil in said reservoir.

5. A thrust bearing comprising a housing formed to provide an oil reservoir, a substantially horizontal shaft, a thrust collar thereon dipping into the oil in the reservoir below the shaft, and a single bearing shoe tiltably suspended above the shaft and cooperating with the thrust surface of the collar.

6. A thrust bearing comprising a housing having a substantially radial surface, a substantially horizontal shaft rotatably mounted in the housing and having a thrust collar extending adjacent to said radial surface, and a single bearing shoe tiltably suspended between said surface and collar and having a bearing surface adapted to cooperate with the thrust surface of said collar.

7. A thrust bearing comprising a shoe having a pivotal mounting to receive the bearing pressure and means for suspending the shoe without interfering with its tilting on its pivot.

8. A thrust bearing comprising a shoe having a pivotal mounting to receive the bearing pressure and suspension lugs at its upper corners for supporting the shoe without interfering with its tilting on its pivot.

9. A thrust bearing shoe having the form of a ring sector with outwardly extending suspension lugs at the outer corners of the sector.

10. A tiltable bearing shoe having a bearing surface on one side and a recess on the opposite side, and an adjustable pivot block mounted in the recess and removably but rigidly attached to the shoe.

11. A tiltable bearing shoe having a thrust surface on one side and a recess on the opposite side, and a pivot block removably but rigidly mounted in the recess and provided with a pivot projection.

12. A tiltable bearing shoe having a thrust surface on one side and a recess on the opposite side, and a pivot block adjustably but rigidly mounted in the recess and having a spherical lug extending outwardly from the shoe.

13. A thrust bearing comprising a substantially horizontal shaft having a thrust surface, a housing surrounding the shaft adjacent to the thrust surface and having an opening above the shaft at the thrust surface, and one or more thrust bearing shoes mounted in the housing in cooperative relation with the thrust surface and removable through the opening in the housing.

14. A thrust bearing comprising a substantially horizontal shaft having at thrust collar, a housing surrounding the thrust collar and having an opening above the thrust collar, and a bearing shoe cooperating with the thrust collar, said shoe being suspended from the housing and removable outwardly through the opening in the top.

15. A thrust bearing comprising a substantially horizontal shaft having a thrust collar, a housing surrounding the thrust collar and having an opening above the thrust collar, a bearing shoe cooperating with the thrust collar, said shoe being suepended from the housing and removable outwardly through the opening in the top, and a cover plate for the opening cooperating with the housing to hold the shoe in position.

16. A thrust bearing comprising a substantially horizontal shaft having a thrust collar, a housing surrounding the thrust collar and having an opening above the thrust collar, a bearing shoe cooperating with the thrust collar and having suspension lugs engaging the housing at the top, and a cover plate for closing the opening of the housing and cooperating therewith to hold the shoe in position.

17. A thrust bearing comprising a substantially horizontal shaft having a thrust collar, a housing surrounding the thrust collar and having an opening above the thrust collar, a bearing shoe cooperating with the thrust collar, said shoe being tiltably mounted on the housing and loosely suspended in the opening of the housing whereby it is removable outwardly, and a cover plate for the housing cooperating therewith to hold the shoe in position without interfering with the tilting thereof.

18. A thrust bearing comprising a housing having a substantially radial surface and an opening above said surface, a substantially horizontal shaft rotatable in the housing and having a thrust collar extending adjacent to said radial surface, and a bearing shoe suspended between said collar and surface and removable outwardly through said opening.

19. A thrust bearing comprising a housing having a substantially radial surface, an opening above said surface and a removable cover plate, a substantially horizontal shaft rotatable in the housing and having a thrust collar extending adjacent to said radial surface, a bearing shoe cooperating with the thrust collar and having a pivotal mounting on the housing, and suspension lugs on the bearing shoe engaging the housing at the opening, said cover plate cooperating with the housing to loosely hold the shoe in position.

20. A thrust bearing comprising a substantially horizontal shaft having a thrust collar, and a bearing shoe tiltably suspended in cooperative relation with the upper portion of said thrust collar.

21. A thrust bearing comprising a housing, a substantially horizontal shaft having a thrust collar rotatably mounted in said housing, and a bearing shoe suspended in cooperative relation with the upper portion of said thrust collar and tiltably mounted on said housing.

22. In combination with a substantially horizontal shaft, a thrust bearing therefor comprising an oil reservoir below the level of said shaft, a thrust collar on the shaft dipping into the oil in said reservoir, and a single bearing shoe cooperating with said thrust collar above the level of the shaft and lubricated by oil carried thereto by said collar.

23. In combination with a substantially horizontal shaft, a thrust bearing therefor comprising a housing for the shaft providing an oil reservoir below the level of said shaft, a thrust collar on said shaft dipping into the oil in said reservoir, and a single bearing shoe tiltably mounted on said housing and cooperating with said thrust collar above the level of the shaft.

24. In combination with a substantially horizontal shaft, a thrust bearing therefor comprising an oil reservoir below the shaft, a thrust collar on the shaft dipping into the oil in said reservoir, and a single bearing shoe cooperating with said thrust collar above the level of the oil and having its bearing surface lubricated only by oil carried thereto by said collar.

25. In combination with a substantially horizontal shaft, a thrust bearing therefor comprising a thrust collar on said shaft, a housing having an opening in its upper portion adjacent said collar, and a bearing shoe cooperating with said thrust collar, said shoe being positioned within said housing adjacent said opening.

26. In combination with a substantially horizontal shaft, a thrust bearing therefor comprising a thrust collar on said shaft, a housing having an opening in its upper portion adjacent said collar, and a bearing shoe cooperating with said thrust collar and readily removable through said opening.

27. In combination with a substantially horizontal shaft, a thrust bearing therefor comprising a thrust collar on said shaft, a housing having an opening in its upper portion adjacent said collar, and a bearing shoe suspended within said opening and cooperating with said thrust collar.

28. In combination with a substantially horizontal shaft, a thrust bearing therefor comprising a thrust collar on said shaft, a housing having an opening in its upper portion adjacent said collar, and a bearing shoe tiltably mounted within said housing adjacent said opening and in cooperative relationship with said thrust collar.

29. In combination with a substantially horizontal shaft, a thrust bearing therefor comprising a thrust collar on said shaft, a housing having an opening in its upper portion adjacent said collar, a bearing shoe mounted within said housing adjacent said opening and in cooperative relation with said thrust collar, and a cover for said opening cooperating with said housing to retain said shoe in position.

30. In combination with a substantially horizontal shaft, a thrust bearing therefor comprising a thrust collar on said shaft, a housing having an opening in its upper portion adjacent said collar, and a bearing shoe cooperating with said thrust collar, said shoe being suspended within said opening and tiltably mounted on said housing.

31. A thrust bearing comprising a housing having a substantially radial surface, a substantially horizontal shaft rotatably mounted in the housing and having a thrust collar extending adjacent to said radial surface, and a single bearing shoe suspended between said surface and collar and cooperating with the thrust surface of said collar.

32. A thrust bearing comprising a housing having a substantially radial surface, a substantially horizontal shaft rotatably mounted in the housing and having a thrust collar extending adjacent to said radial surface, and a single bearing shoe tiltably mounted on said radial surface above said shaft and cooperating with the thrust surface of said collar.

33. In combination with a substantially horizontal shaft, a thrust bearing therefor comprising a thrust collar on said shaft, a housing providing an oil reservoir below the shaft and having an opening adjacent said collar above the level of the oil, and one or more bearing shoes cooperating with said thrust collar and removable through said opening.

In witness whereof, I have hereunto set my hand this 11 day of January, 1918.

ALBERT KINGSBURY.